United States Patent
Wu

(10) Patent No.: US 7,426,686 B2
(45) Date of Patent: Sep. 16, 2008

(54) SYSTEM AND METHOD FOR VERIFYING DATA INTEGRITY

(75) Inventor: Cheng-Meng Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 553 days.

(21) Appl. No.: 10/996,825

(22) Filed: Nov. 24, 2004

(65) Prior Publication Data
US 2005/0097411 A1    May 5, 2005

(30) Foreign Application Priority Data
May 12, 2003    (TW) .............................. 92134335 A

(51) Int. Cl.
*H04L 1/00* (2006.01)
(52) U.S. Cl. ...................... 714/823; 714/779
(58) Field of Classification Search .................. 714/823, 714/779
See application file for complete search history.

(56) References Cited

U.S. PATENT DOCUMENTS

| | | | |
|---|---|---|---|
| 4,393,500 A | 7/1983 | Imazeki et al. | |
| 5,040,214 A * | 8/1991 | Grossberg et al. | 704/240 |
| 5,111,457 A | 5/1992 | Rabjohns et al. | |
| 5,621,660 A * | 4/1997 | Chaddha et al. | 709/247 |
| 5,768,535 A * | 6/1998 | Chaddha et al. | 709/247 |
| 6,011,868 A * | 1/2000 | van den Branden et al. | 382/233 |
| 6,185,134 B1 | 2/2001 | Tanaka | |

FOREIGN PATENT DOCUMENTS

JP    10-240629 A    9/1998

* cited by examiner

*Primary Examiner*—Mujtaba K Chaudry
(74) *Attorney, Agent, or Firm*—Morris Manning Martin LLP; Tim Tingkang Xia, Esq.

(57) ABSTRACT

A system for verifying data integrity includes a central processing unit (CPU) (1), a non-volatile random access memory (NVRAM) (2), and a program memory (3). The NVRAM includes: a plurality of data blocks (23), each data block including a plurality of data bits (20) for storing bit data; a first recognition bit (21) for storing a first recognition code; and a second recognition bit (22) for storing a second recognition code. The program memory stores program modules. The CPU updates and deletes data in data blocks, reads a first recognition code and a second recognition code in a data block in which bit data are to be read, and identifies whether the bit data are complete according to a combination of the first recognition code and the second recognition code. A related method for verifying data integrity is also disclosed.

11 Claims, 5 Drawing Sheets

SYSTEM AND METHOD FOR VERIFYING DATA INTEGRITY

BACKGROUND OF INVENTION

1. Field of Invention

The present invention relates generally to computer memory systems, and especially to systems and methods for verifying data integrity.

2. Prior Art of Invention

Modern societies have become heavily dependent upon computers. In today's first world, computers are used for everything from financial planning to company payroll systems to aircraft guidance systems. Because of the widespread use of computer systems, data corruption is a problem that can affect almost any individual whether at work or in leisure. The issue of data corruption continues to plague both the computer hardware and computer software industries.

Accordingly, computer systems typically include some form of storage system for storing setting status information and current operation status information. Conventionally, the storage system is a non-volatile random access memory (NVRAM) such as a magnetic random access memory (MRAM), a static random access memory (SRAM), a Flash memory etc. It is customary to store critical information in an NVRAM as a precaution against information loss due to power failure or other unexpected shutdowns. However, because of factors such as electrical noise and failure of the NVRAM itself, it is still possible for vital NVRAM data to be lost. Consequently, there is a need to provide a mechanism for verifying data integrity and correctness when the computer system is started up again.

The art of verifying data integrity and correctness in a computer system is disclosed in publications such as U.S. Pat. No. 6,185,134, issued on Feb. 6, 2001 and entitled "Flash Memory Control Method, Flash Memory System Using the Control Method and Flash Memory Device Using the Control Method." The patent provides a method for correcting errors of a Flash memory, which comprises the steps of: modifying the data of a group of memory units, each having a plurality of Flash memory cells adapted to erase data therefrom and write data therein; checking for the presence and absence of an error of not properly modifying the data of the group of memory units; and determining the completion of proper modification of the data of the group of memory units, provided that an error is detected and the error can be corrected.

However, the method described in the patent requires the Flash memory to be divided into a plurality of memory cells. The division is very complex, and it takes much time to check the data. What is needed is a system and method for verifying data integrity which can overcome the above-described shortcomings.

SUMMARY OF THE INVENTION

A main objective of the present invention is to provide a system for verifying data integrity which can verify whether data are complete.

Another objective of the present invention is to provide a method for verifying data integrity when the data are updated.

A further objective of the present invention is to provide a method for deleting data by verifying integrity of the data.

A still further objective of the present invention is to provide a method for reading data after verifying the integrity of the data.

To achieve the first objective, a system for verifying data integrity in accordance with a preferred embodiment of the present invention comprises a central processing unit (CPU), a non-volatile random access memory (NVRAM), and a program memory.

The NVRAM comprises a plurality of data blocks. Each data block comprises a plurality of data bits for storing bit data, a first recognition bit for storing a first recognition code, and a second recognition bit for storing a second recognition code. The CPU updates and deletes data stored in the data blocks, reads a first recognition code and a second recognition code of any data block in which bit data are to be read, and identifies complete bit data according to the first recognition code and the second recognition code.

The program memory comprises: a memory cell obtaining module for obtaining enough memory cells from the NVRAM for storing data; a data reading module for reading data from data blocks; a data writing module for writing data into the data blocks; a data updating module for updating data in the first recognition bit, the second recognition bit, and data bits of the data blocks; and a data determining module for determining whether bit data in a data block are complete according to a combination of the first recognition bit and the second recognition bit.

To achieve the second objective, the present invention provides a preferred method for verifying data integrity when the data are updated. The method comprises the step of: (a) reading a second recognition code of a data block in which the data are to be updated; (b) updating the first recognition code of the data block with the second recognition code; (c) updating the second recognition code with its own binary complement; (d) writing the updated first recognition code into the first recognition bit in the data block; (e) writing updated bit data into the data bits in the data block; and (f) writing the updated second recognition code into the first recognition bit in the data block. When any abnormal interruption occurs during step (e), the first recognition code equals the second recognition code, and the updated data are regarded as incomplete. When no abnormal interruption occurs during step (e), the first recognition code does not equal the second recognition code, and the updated data are regarded as being complete.

To achieve the third objective, the present invention provides a preferred method for deleting data by verifying data integrity. The method comprises the steps of: (a) reading the second recognition code in a data block in which bit data are to be deleted; and (b) writing the second recognition code into a first recognition bit in the data block; wherein the first recognition code equals the second recognition code, and data bits of the data block are considered as being blank.

To achieve the fourth objective, the present invention provides a preferred method for reading data after verifying the integrity of the data. The method comprises the steps of: (a) reading a first recognition code in a data block in which data are to be read; (b) reading a second recognition code in the data block; (c) determining whether the first recognition code equals the second recognition code in the data block; and (d) reading bit data in the data block, if the first recognition code does not equal the second recognition code; or (e) displaying information indicating that the bit data are incomplete, if the first recognition code equals the second recognition code.

Other objects, advantages and novel features of the present invention will be drawn from the following detailed description with reference to the attached drawings, in which:

DETAILED DESCRIPTION OF THE PREFERRED EMBODIMENT

Figure 1:
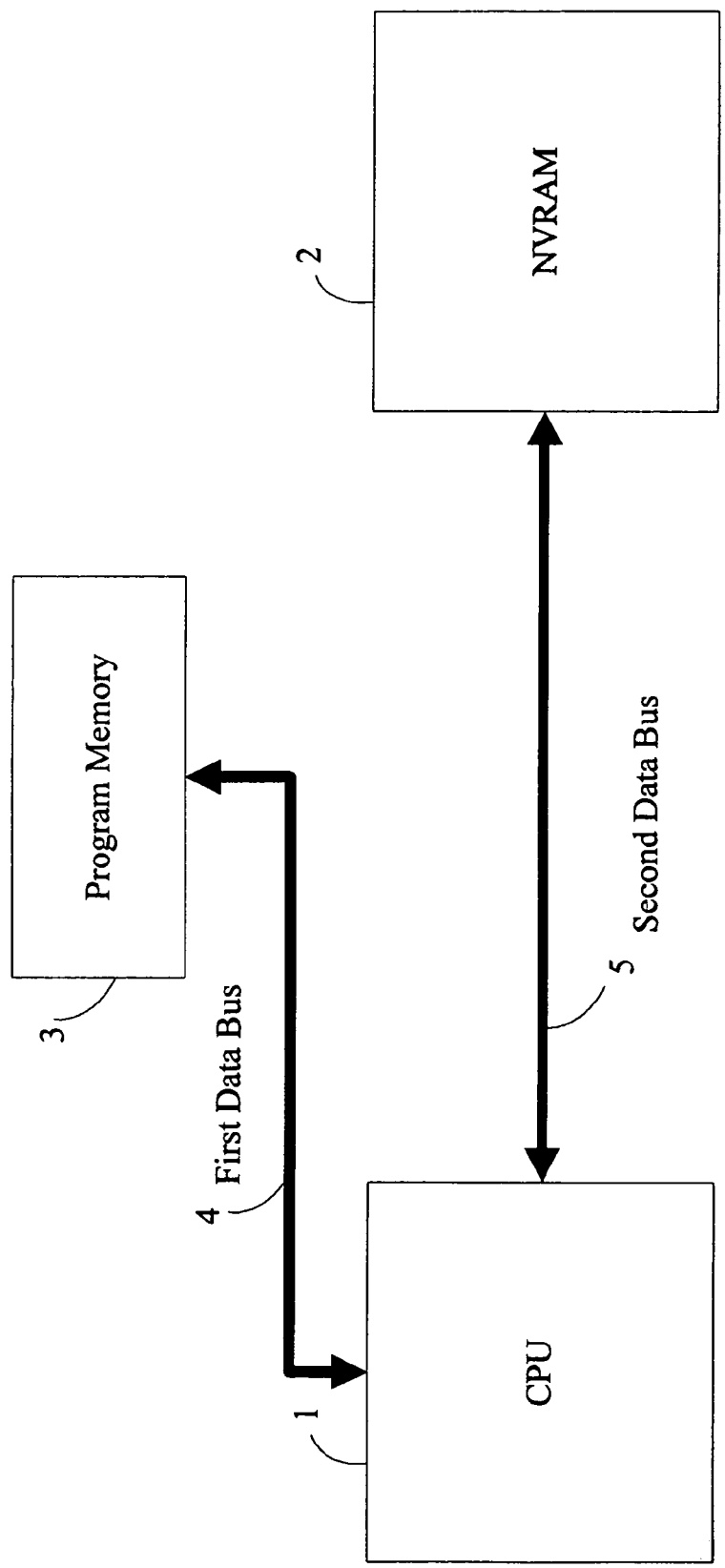
FIG. 1 is a block diagram of hardware configuration of the system for verifying data integrity in accordance with the preferred embodiment of the present invention.

FIG. 1 is block diagram of hardware configuration of a system for verifying data integrity (hereafter, "the system") in accordance with the preferred embodiment of the invention. The system comprises a central processing unit (CPU) 1, a non-volatile random access memory (NVRAM) 2, and a program memory 3. The CPU 1 is connected with the program memory 3 through a first data bus 4, and is connected to the NVRAM 2 through a second data bus 5. The NVRAM 2 is logically divided into a plurality of memory cells for storing data. The program memory 3 is provided for storing program modules (described in detail below in relation to FIG. 4). The program memory 3 may be a read-only memory (ROM), a Flash memory, a hard disk, or the like. The CPU 1 is provided for updating, deleting, and reading data in the NVRAM 2 through the program modules.

Figure 2:
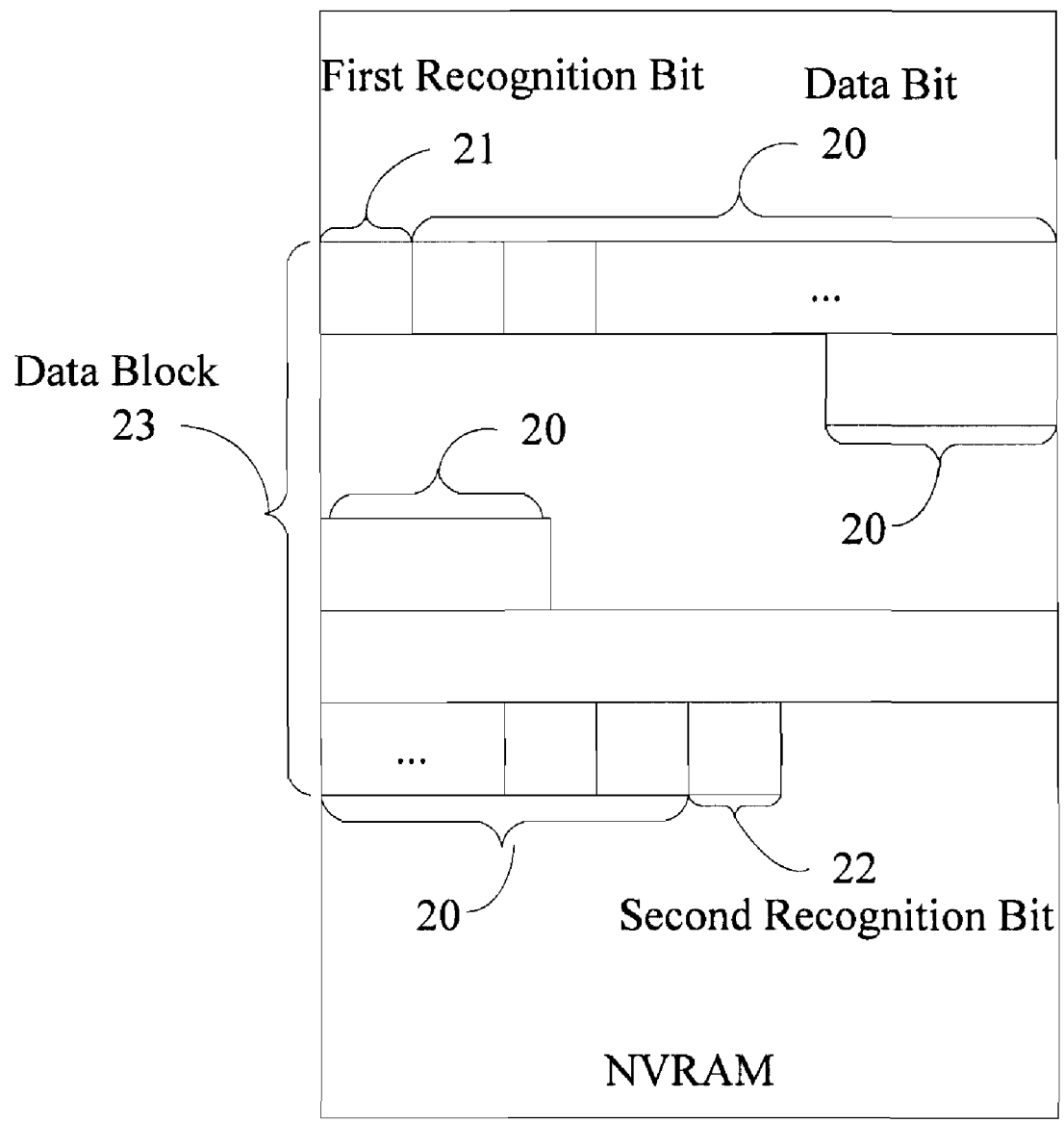
FIG. 2 is a schematic diagram of a storage structure of an NVRAM of the system of FIG. 1.

FIG. 2 is a schematic diagram of a storage structure of the NVRAM 2. The NVRAM 2 is logically divided into a plurality of memory cells. Each memory cell comprises a plurality of data bits 20. After storing data in the data bits 20 of the memory cells, the CPU 1 stores a first recognition code in a first recognition bit 21 in front of the data bits 20, and stores a second recognition code in a second recognition bit 22 behind the data bits 20. The data bits 20, the first recognition bit 21, and the second recognition bit 22 constitute a data block 23. Each bit stores a binary digit "0" or "1."

Figure 3:
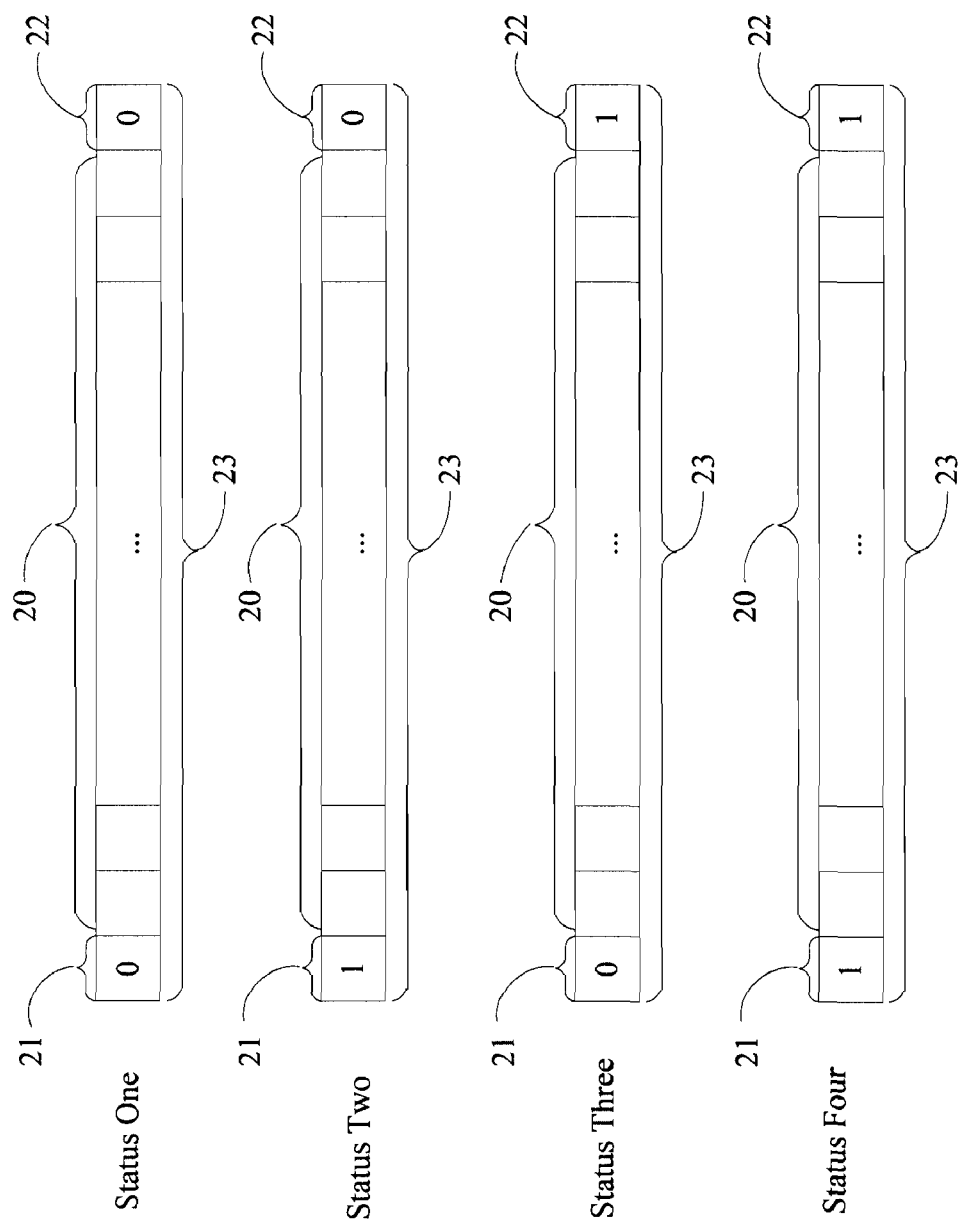
FIG. 3 is a schematic diagram showing different statuses of a data block stored in the NVRAM of FIG. 2.

FIG. 3 is a schematic diagram showing different statuses of a data block 23 stored in the NVRAM 2. The data block 23 contains a plurality of data bits 20, a first recognition bit 21, and a second recognition bit 22. The first recognition bit 21 and the second recognition bit 22 in combination indicate a status of the data block 23. Because the first recognition bit 21 and the second recognition bit 22 may each be "0" or "1," the data block 23 may be in any one of the following four statuses: (0,0), (1,0), (0,1), or (1,1). In status (1,0) and status (0,1), each first recognition code is different from the corresponding second recognition code, which means that bit data stored in the data bits 20 of the data block 23 are complete, i.e., the stored bit data in the data block 23 or integrity thereof is considered as being valid. In status (0,0) and status (1,1), each first recognition code equals the corresponding second recognition code, which means that bit data stored in the data bits 20 of the data block 23 are incomplete, i.e., the stored bit data in the data block 23 or integrity thereof is considered as being invalid. In such case, the data bits 20 of the data block 23 are considered as being blank.

Figure 4:
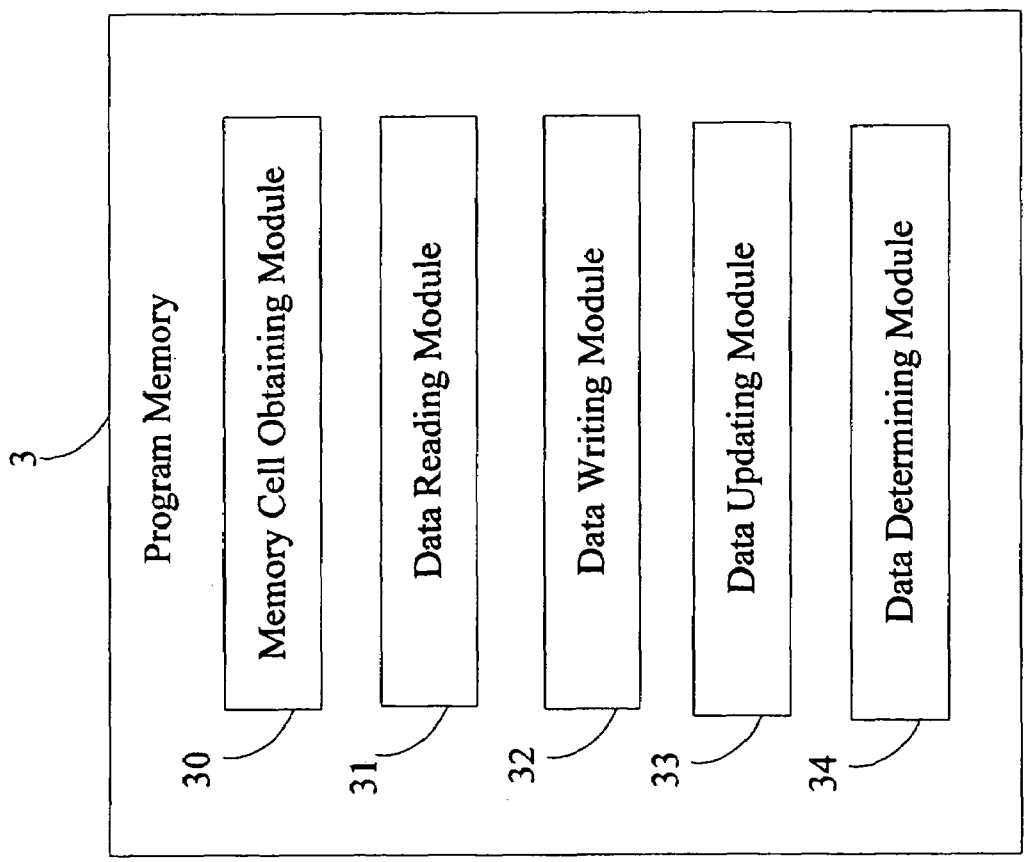
FIG. 4 is a schematic diagram of main function modules of a program memory of the system of FIG. 1.

FIG. 4 is a schematic diagram of main function modules of the program memory 3. The program memory 3 comprises a memory cell obtaining module 30, a data reading module 31, a data writing module 32, a data updating module 33, and a data determining module 34. The memory cell obtaining module 30 is provided for obtaining memory cells from the NVRAM 2 for storing data. The data reading module 31 is used for reading data from data blocks 23. The data writing module 32 is for writing data into the data blocks 23. The data updating module 33 is for updating data in first recognition bits 21, second recognition bits 22, and data bits 20 of the data blocks 23. The data determining module 34 is for determining whether bit data stored in a data block 23 are complete according to a combination of a first recognition bit 21 and a second recognition bit 22 of the data block 23.

Figure 5C:
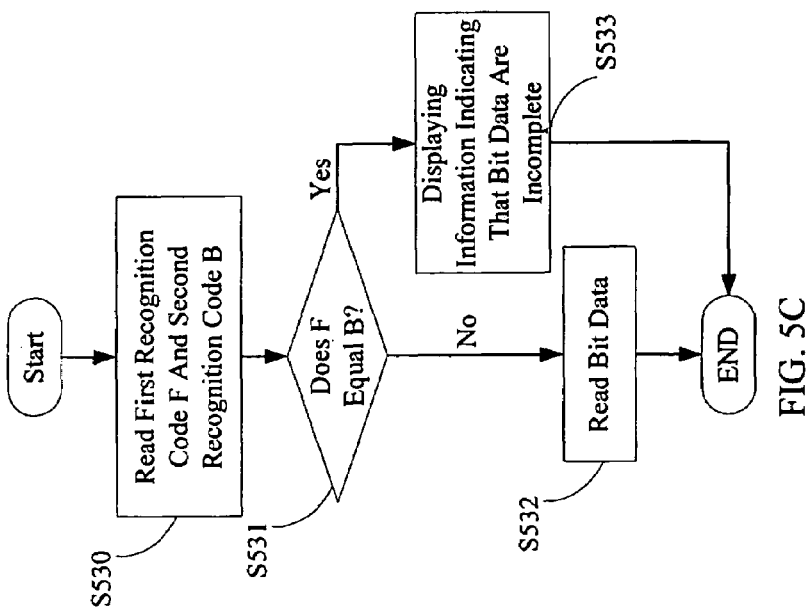
FIG. 5C is a flowchart of reading data stored in a data block of the NVRAM after verifying the integrity of the data.
Figure 5B:
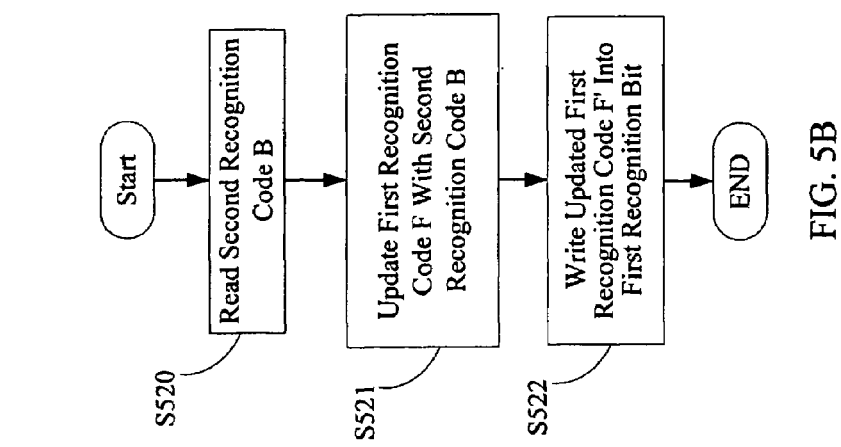
FIG. 5B is a flowchart of deleting data in a data block of the NVRAM by verifying integrity of the data.
Figure 5A:
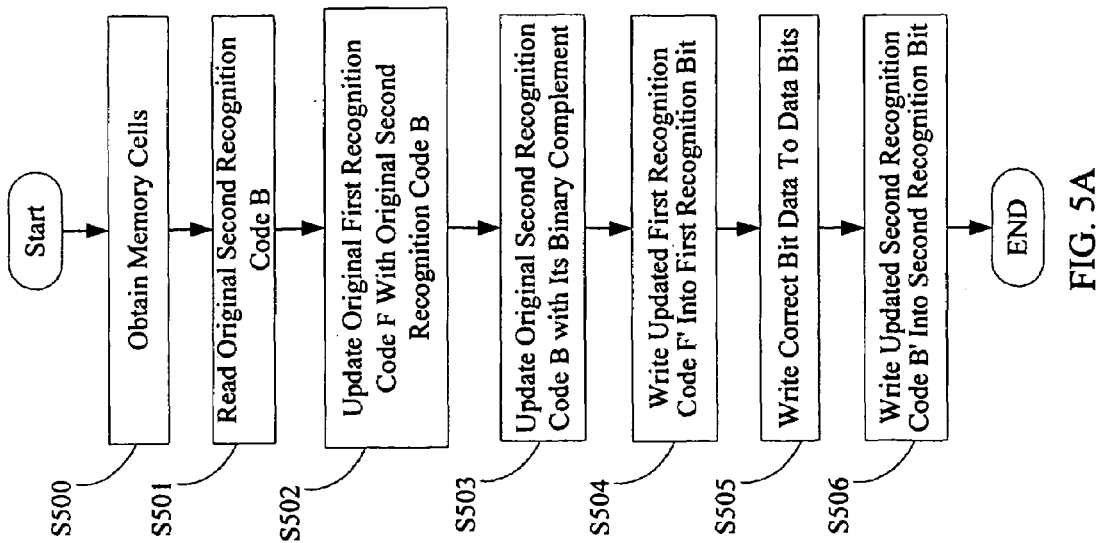
FIG. 5A is a flowchart of verifying data integrity in a data block of the NVRAM when the data are updated.

FIG. 5A is a flowchart of verifying data integrity in a data block 23 when the data are updated, which is done by implementing the above-described system. Original data stored in the data bits 20, the first recognition bit 21 and the second recognition bit 22 of the data block 23 are respectively designated as "D," "F" and "B," and corresponding updated data are respectively designated as "D'," "F'" and "B'." In step S500, the CPU 1 obtains enough memory cells from the NVRAM 2 via the memory cell obtaining module 30 for storing updated data. In step S501, the CPU 1 reads the original second recognition code B from the second recognition bit 22 via the data reading module 31. In step S502, the CPU 1 updates the original first recognition code F with the original second recognition code B via the data updating module 33. Thus, the updated first recognition code F'=B. In step S503, the CPU 1 updates the original second recognition code B with its binary complement via the data updating module 33. Thus, the updated second recognition code B'=!B. For example, if the original second recognition code B is "0," the updated second recognition code B' is "1." In contrast, if the original second recognition code B is "1," the updated second recognition code B' is "0." In step S504, the CPU 1 writes the updated first recognition code F' into the first recognition bit 21 via the data writing module 32. In step S505, the CPU 1 writes the correct bit data into the data bits 20 via the data writing module 32. In step S506, the CPU 1 writes the updated second recognition code B' into the second recognition bit 22 via the data writing module 32.

If there is any abnormal interruption during writing the updated bit data into the data block 23, step S506 is not performed. In such case, the first recognition code (now F') equals the second recognition code (still B). Therefore, the CPU 1 regards the bit data in the data bits 20 as being incomplete via the data determining module 34.

FIG. 5B is a flowchart of deleting data in a data block 23 by verifying integrity of the data, which is done by implementing the above-described system. In step S520, the CPU 1 reads a second recognition code B from a second recognition bit 22 of the data block 23 in which the bit data are to be deleted via the data reading module 31. In step S521, the CPU 1 updates a first recognition code F with the second recognition code B via the data updating module 33. Thus, the updated first recognition code F'=B. In step S522, the CPU 1 writes the updated first recognition code F' into the first recognition bit 21 via the data writing module 32.

After performing the above-described procedures, the first recognition code (now F') equals the second recognition code (still B). Accordingly, the data bits 20 are considered as being blank.

FIG. 5C is a flowchart of reading data in a data block 23 after verifying the integrity of the data, which is done by implementing the above-described system. In step S530, the CPU 1 reads a first recognition code F from a first recognition bit 21 of the data block 23, and reads a second recognition code B from a second recognition bit 22 of the data block 23 in which bit data are to be read via the data reading module 31. In step S531, the CPU 1 determines whether the first recognition code F equals the second recognition code B via the data determining module 34. If the first recognition code F does not equal the second recognition code B, bit data in the corresponding data bits 20 are complete. In step S532, the CPU 1 reads the bit data via the data reading module 31. If the first recognition code F equals the second recognition code B, the bit data in the corresponding data bits 20 are regarded as being incomplete. In step S533, the system displays information indicating that the bit data are incomplete through an output device.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for verifying data integrity, the system comprising:
    a non-volatile random access memory (NVRAM) comprising a plurality of data blocks, each data block comprising:
    a plurality of data bits for storing bit data;
    a first recognition bit for storing a first recognition code; and
    a second recognition bit for storing a second recognition code; and
    a central processing unit (CPU) for updating and deleting the bit data in the data blocks, reading a first recognition code and a second recognition code of any data block in which the bit data are to be read, and identifying incomplete bit data according to the first recognition code and the second recognition code.

2. The system as claimed in claim 1, further comprising a program memory, the program memory comprising:
    a memory cell obtaining module for obtaining enough memory cells from the NVRAM for storing bit data;
    a data reading module for reading bit data from the data blocks;
    a data writing module for writing bit data into the data blocks;
    a data updating module for updating bit data in the first recognition bits, the second recognition bits, and the data bits of the data blocks; and
    a data determining module for determining whether bit data in a data block are complete according to a combination of the first recognition bit and the second recognition bit of the data block.

3. The system as claimed in claim 1, wherein the CPU identifies incomplete bit data by determining whether the first recognition code equals the second recognition code.

4. The system as claimed in claim 3, wherein the CPU determines that the bit data are incomplete if the first recognition code equals the second recognition code.

5. The system as claimed in claim 3, wherein the CPU determines that the bit data are complete if the first recognition code does not equal the second recognition code.

6. The system as claimed in claim 1, wherein incomplete bit data means the bit data are invalid.

7. A method for verifying integrity of data stored in a memory of a system, comprising the steps of:
    identifying a data block of said data stored in said memory;
    identifying a first recognition code in front of said data block;
    identifying a second recognition code behind said data block; and
    verifying said first and second recognition codes to directly decide said integrity of said data block of said data.

8. The method as claimed in claim 7, further comprising the step of updating said data block of said data with a new data block in said memory by means of the steps of:
    replacing said first recognition code with said second recognition code;
    replacing said data block with said new data block; and
    substituting said second recognition code with a complement of said second recognition code.

9. The method as claimed in claim 7, further comprising the step of deleting said data block of said data from said memory by means of the steps of:
    retrieving said second recognition code; and
    substituting said first recognition code with said second recognition code.

10. The method as claimed in claim 7, further comprising the step of reading said data block of said data from said memory by means of the steps of:
    retrieving said first and second recognition codes; and
    retrieving said data block of said data as a readable status based on comparison of said first and second recognition codes.

11. The method as claimed in claim 7, wherein said integrity of said data block is decided as being invalid when said first recognition code is identical to said second recognition code.

* * * * *